Sept. 2, 1969 P. N. CROCKETT ET AL 3,465,132

CIRCUITS FOR HANDLING INTENTIONALLY MUTATED INFORMATION WITH VERIFICATION OF THE INTENTIONAL MUTATION

Filed Aug. 23, 1965 3 Sheets-Sheet 1

INVENTORS
PETER N. CROCKETT
FRANK J. HACKL
THOMAS S. STAFFORD

BY Robert Lieber

ATTORNEY

United States Patent Office 3,465,132
Patented Sept. 2, 1969

3,465,132

CIRCUITS FOR HANDLING INTENTIONALLY MUTATED INFORMATION WITH VERIFICATION OF THE INTENTIONAL MUTATION

Peter N. Crockett, Wappingers Falls, Frank J. Hackl, Poughkeepsie, and Thomas S. Stafford, Wappingers Falls, N.Y., assignors to International Business Machines Corporation, Armonk, N.Y., a corporation of New York Filed Aug. 23, 1965, Ser. No. 481,689
Int. Cl. G06f *11/00;* G11b *13/00*
U.S. Cl. 235—153 15 Claims

ABSTRACT OF THE DISCLOSURE

Invalid test signals are deliberately transmitted into a computer from external equipment to be used to test the error detection circuits of the computer. However, in order to provide a validity check on the transmitted signals which assures that they arrive in the computer in the desired invalid form, and not in some other invalid form due to transmission error, the signals are first sent to the computer in a valid form, then checked for validity upon reception, and afterwards converted to the desired invalid form intended for the test application. The conversion is made by logical manipulation of the signal elements as they are received in the valid form. In a specific example test signals with a bad parity condition are entered into a computer main store by transmitting signals with good parity and redundancy through a parity check circuit preceding the store and thereafter logically Or-ing bits of the redundant signal to construct the desired test signals with bad parity.

This invention relates to circuits for transmitting intentionally mutated digital information while using ordinary parity checking circuits to verify accurate translation of the mutated information.

Ordinarily parity checking circuits are used to verify that information which is intended to satisfy a predetermined parity relationship is not altered in the process of translating the information through a transmission path. If it were desired to move predetermined test information having a predetermined faulty parity relationship through the same path it would ordinarily be considered mandatory to inhibit or ignore the operation of the parity checking circuit and assume that the information passed through the path without change. However, this assumption may not be realistic if the operational status of the equipment controlling the handling of the information is uncertain or if the form of the information when it arrives at the input terminus of the path is uncertain.

For example, it is unquestionably useful to transmit information from a magnetic tape store to the random access main store of a digital computer using parity checking to detect uncontrollable sensing and/or transmission errors. It is also useful to transmit programs of test information from tape to main store wherein the information is intentionally mutated in a predetermined manner so that circuits within the computer may be tested to see that they respond appropriately to signals having a known faulty parity relationship as well as to signals having correct parity. For this, however, it is necessary to have a known faulty relationship else otherwise it would be impossible to ascertain whether a responding circuit or its input information is at fault.

As another example of a situation in which it may be desirable to produce information in a main store having a known albeit faulty parity relationship, consideration may be given to the system disclosed in the copending patent application of F. J. Hackl, Ser. No. 420,621, filed Dec. 23, 1964 and now Patent No. 3,343,141 issued Sept. 19, 1967, which is assigned to the assignee of the present invention. In that system a portion of each word transmitted from a tape store to a main computer store ordinarily constitutes a parity checking reference, but in some instances the same portion of certain words may be used as computer sequence control intelligence. In these instances the control intelligence does not represent parity and may indeed fail to satisfy the parity check relationship ordinarily satisfied by transmitted parity digits. It is desirable, however, to always ascertain that the information as transferred into the main store is in the desired form; i.e. that it has not been unexpectedly mutated in the process of handling between the tape and the main store.

Accordingly, one object of this invention is to provide a system for introducing a predetermined mutation into transmitted intelligence while using an ordinary parity check circuit at a receiving terminus to check the intelligence and to emit an error or "no check" indication only if a mutation other than said predetermined mutation has occurred.

Another object is to provide a system for transmitting programmed intelligence between a large capacity bulk store and an intermediate capacity main store of a computer system wherein certain items of transmitted intelligence are intentionally programmed to have a predetermined mismatched or "no check" parity relationship whereas other items of transmitted intelligence may be programmed to have a matched parity relationship, and wherein ordinary parity checking means are employed to verify correct transmission of both matched and mismatched items.

Yet another object is to provide a circuit arrangement for translating digital test information having a predetermined "no check" parity condition from a peripheral large capacity store to the intermediate capacity main store of a digital computer using ordinary parity checking circuits to verify correct handling of the test information.

In transmitting intelligence from a large capacity peripheral store (e.g. a tape store) to an intermediate capacity main store of a computer through a connecting system, the more complex the connecting system the greater is the likelihood that intelligence will be mutated in an indeterminate sense in passing through the connecting system. Suppose then that transmitted intelligence is to be used after storage in the main store as test information to test the internal transmission paths and sequence controls of the computer, and that a section of the sequence controls of the computer is allotted to the control of a section of the connecting system. To limit the number of probable causes to error within the computer it would be mandatory to check the sequence controls of the computer before transmitting the test intelligence to the main store, even though it is intended that the stored test information be thereafter used to check the sequence controls.

Accordingly yet another object of the invention is to provide a simplified transmission connection between a peripheral bulk store and a computer main store, controlled by a very small discrete section of the computer sequence controls and which can be rapidly and economically checked for circuit faults.

A feature of the invention is concerned with the provision of controls for the receiving terminus of a digital pulse information transmission path which can be conditioned to pass parity checked digital information words into a receiving register while selectively controlling the state of the register in accordance with intelligence carried in previously transmitted words, and, in effect, thereby selectively alter or mutate the transmitted intelligence in a predetermined manner. Since the previously transmitted intelligence has been parity checked it is seen that the mutation of the intelligence is predetermined if, and only if, the associated current and previous transmitted words are predetermined. It is also seen that such predetermined mutated intelligence is effectively verified by satisfactory parity checks made on the associated transmitted intelligence.

According to a more specific aspect of the invention a system is disclosed herein for transmitting test information between a peripheral bulk store and a computer main store using the buffer input/output register of the main store as the aforementioned receiving register. Predetermined information word units are passed through a special test program loading connecting path and delivered to the buffer register. From the buffer register information words are forwarded to a selected internal address location of main store. By addressing one address location for each pair of incoming predetermined words, while controlling the sense amplifier gates of the store, a mixing effect is obtained in which corresponding digits of the words are mixed according to an OR function. Each resultant mixed word correctly transferred to the main store is fully checked by virtue of individual check indications obtained from the associated pair of words, and yet may satisfy a "no check" parity relationship due to predetermined digit changes resulting from the process of mixing.

A noteworthy aspect of the last mentioned feature is the particular arrangement of controls used for the test program loading path. These are characterized by remarkable simplicity and yet enable a programmer to establish an arbitrary pattern of test information in the main store and to verify the establishment of the said arbitrary pattern using ordinary parity checking circuits stationed in the test program loading path.

Controls such as these could with slight modification be used to circulate predetermined "no check" test or control information, with effective verification of the information, through any section of a data processing system. The essential principle of handling involved in this aspect of the invention may be characterized as follows. When two successive words of predetermined digital information, each satisfying a predetermined parity relationship, are circulated through a parity checked transmission path, and correspondingly positioned digits of the words are mixed at a point beyond the parity checking station, the resultant word obtained by such mixing will if not mishandled have a predetermined parity condition, but need not satisfy the same predetermined relationship as the associated pair of words.

The foregoing and other objects and features hereof may be more fully appreciated by considering the following detailed description thereof which refers to the accompanying figures of drawing wherein.

Figure 1:
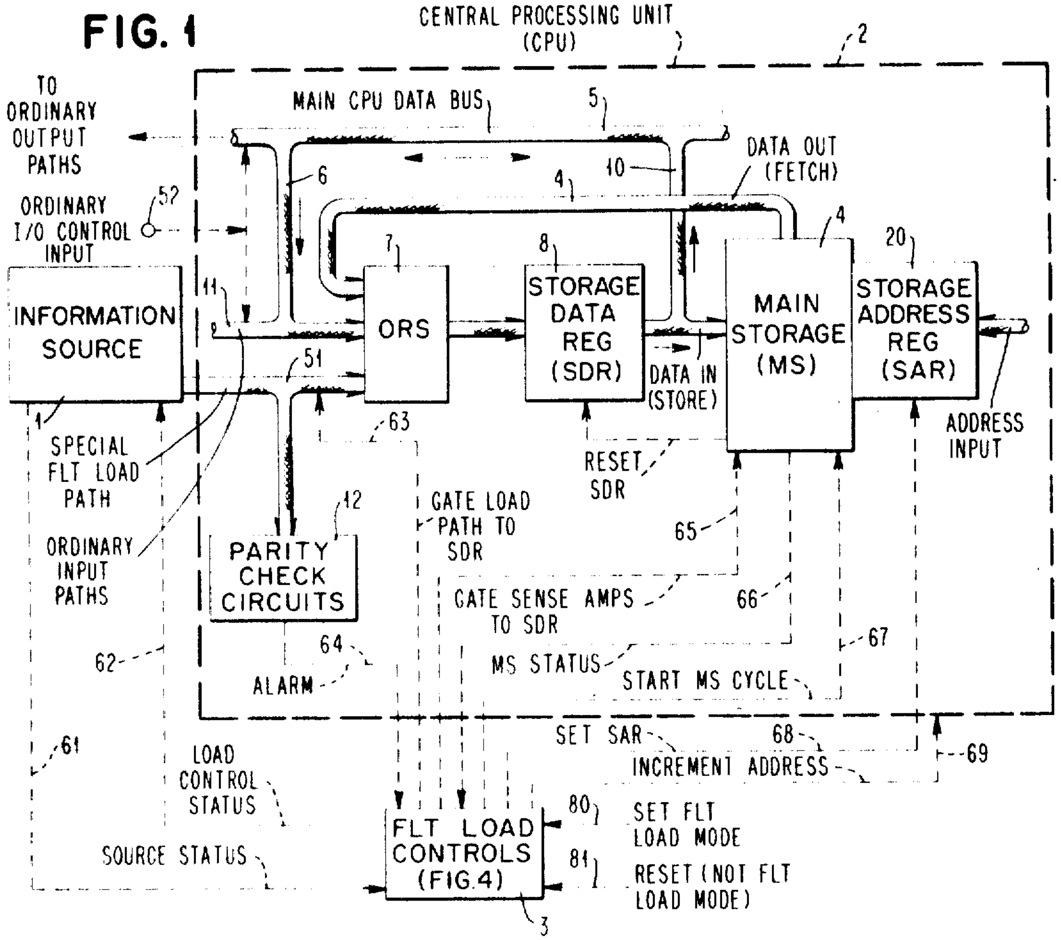
FIG. 1 is a schematic block diagram illustrating the general organization of a system embodying the present invention.

FIG. 1 illustrates a typical application of the present invention. Shown in FIG. 1 are an information source 1, a central processing unit 2, and Fault Location Test Program (FLT) load controls 3. The central processing unit (hereinafter abbreviated CPU) includes a main store 4 (hereinafter abbreviated MS), arithmetic circuits (not shown) and internal testing controls (also not shown) which are used to detect and locate faults throughout the CPU.

A main data bus 5 is used to circulate data throughout the CPU. Information carried on this bus is arranged in parallel word units of 36 bits. These units each include a first group of four bits which are used ordinarily as circulating parity check bits, and a second group of thirty-two bits which represent circulating information and ordinarily have a predetermined partity relationship to the four bits in the first group. During ordinary processing activities internal to the CPU, information words are passed from the data bus 5 into MS via a circuit path 6, a first group of inputs of OR-circuits indicated schematically at 7, and a storage data register 8 (hereinafter abbreviated SDR). SDR is a 36-stage register serving as the buffer input/output register of MS. In the reverse direction stored information is transferred from MS to SDR via a second group of inputs 9 of the OR-circuits 7, and from SDR to the bus 5 via the circuit path shown schematically at 10.

Information may be transferred to MS from sources external to CPU via any of a plurality of ordinary input paths indicated schematically at 11, the first group of inputs of OR-circuits 7, and SDR. It should be understood that the ordinary input paths 11 may include a complex of channel connecting systems each capable of independently carrying information between a number of terminal stations and an interface to the CPU on an asynchronous basis relative to the timing of internal CPU activities. Since the construction and operation of such circuits are not pertinent to the operation of the present invention they are adequately represented by the connections suggested schematically at 11.

It should further be understood that throughout the CPU, and at strategic positions along the input path 11, parity check circuits are stationed to intercept and check circulating information. It is generally well-known that such circuits operate to derive new parity bits, to compare the derived bits to the circulating parity bits accompanying the circulating information units, and to signal alarm or error indications upon detection of mismatch. These parity checking circuits are of conventional design and, with the exception of a check circuit shown at 12, are also not pertinent to the operation of the present invention. Hence, the internal organization of the check circuits will not be described or considered in detail herein, and only the function of the circuit 12 will be dealt with further below.

Before considering the inventive interaction between the FLT load controls 3 and the CPU, it would be well to first understand the operation of the store MS. In this regard the following observations are pertinent. In the present embodiment, MS is chosen to be a random access magnetic core storage matrix, although this is not particularly essential to the operation of the invention, and the adaption of the invention to other types of storage system will be readily apparent to those skilled in the design and data processing systems. Within MS intelligence units, each consisting of thirty-six bits, are stored at discrete address locations which are selected on a random access basis in accordance with the information held in a storage address register 20 (hereinafter abbreviated SAR). MS contains internal controls which are effective to pass data between internal storage address locations, specified by SAR, and SDR on a predetermined cyclic time schedule explained below with reference to FIG. 2. For each transfer, the CPU sequence controls ordinarily provide two discrete signals. One of these—a start signal—instructs MS to initiate a transfer cycle, and the other signal is one which selects the direction of the transfer. If the information is to be moved from a source external to MS into MS, the action of MS is termed a STORE cycle, and a direction selecting signal to that effect is furnished to MS by the CPU sequence controls. A transfer in the reverse direction, from MS through SDR to the bus 5, is termed a FETCH cycle and an appropriate selection signal for this is also provided by the CPU controls to MS.

Figure 2:
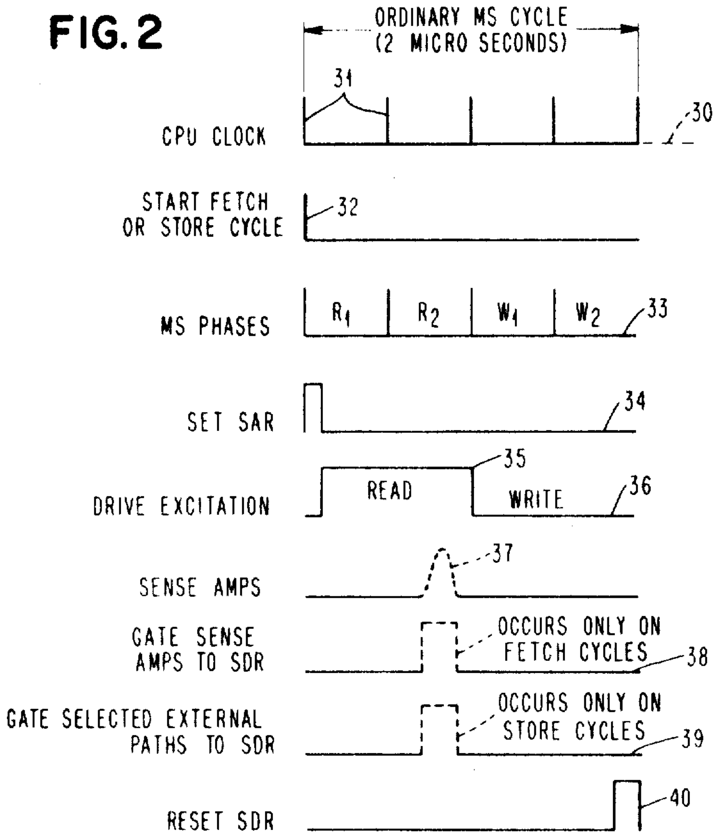
FIG. 2 is a timing chart illustrating the cyclic timing of effects produced internally within the main store shown in FIG. 1.

Referring to FIG. 2 it may be seen that activities within the CPU are controlled by clock signals indicated at line 30. These are characterized as pulses 31 recurring periodically at uniform intervals of one-half microsecond duration. A STORE or FETCH cycle of MS begins only when a start signal 32 is issued by CPU sequence controls; for example, the segment of CPU sequence controls represented by the load controls 3. When this occurs MS is invariably sequenced through four discrete operational phases, each of one-half microsecond duration, characterized generally at 33. These four distinct phases of activity of MS are denoted by the symbols $R_1$, $R_2$, $W_1$, and $W_2$, respectively.

As suggested at 34, during phase $R_1$ of an MS cycle, an address word contained in a register external to SAR, is transferred into SAR by a SET SAR signa. With a slight delay to allow the state of SAR to settle to a stable condition the drive excitation lines of MS are first driven to a READ polarity 35 and maintained there at until the end of the interval $R_2$. Then at the beginning of $W_1$ the drive excitation polarity is reversed to a WRITE level 36. At approximately the mid point of phase $R_2$ signals corresponding to the information stored at the address designated by the contents of SAR appear at outputs of 36 individual sense amplifiers, as indicated generally at 37. The signals 37 are shown schematically in dotted outline since the presence of output pulses will signify the transfer of one binary digital condition, while the absence of output pulses will signify the transfer of an opposite binary condition.

If MS is directed to execute a FETCH cycle by the CPU sequence controls, the outputs of the sense amplifiers will be gated into SDR during interval $R_2$ as suggested at 38. However, if a STORE operation is selected signals on one of the external circuit path connections (6, 11, 51) would be selectively gated into SDR as suggested at 39, and the gating of the sense amplifier outputs to SDR would be suppressed.

In $W_1$ and $W_2$ the contents of SDR are transferred to the internal address location in MS specified by SAR. Thus, in a FETCH cycle information 37 appearing at the sense amplifier outputs during $R_2$ will be regeneratively transferred from SDR into the original address location within MS. In effect this completes a cycle of nondestructive readout of the information at the specified address location. On the other hand, in a STORE cycle the sense amplifier outputs during phase $R_2$ are blocked in favor of an external transfer to SDR as suggested at 39. Hence, in a STORE cycle information transferred from SDR to MS during phases $W_1$ and $W_2$ represents information newly acquired from an external source during the previous phase $R_2$.

Toward the end of $W_2$ SDR is reset as suggested at 40. At this point MS either becomes inactive or starts another cycle according to the condition of its start and operation (STORE-FETCH) selecting lines.

Assume then, referring to FIG. 1, that a fault location test program (FLT) is to be loaded into MS from an external source such as the source 1. Since the ordinary input paths suggested at 11 are controlled by a complex network of input/output controls suggested symbollically at 52, before such a program could be transferred to MS via a section of path 11 it would be necessary to check out the full network of controls 52, or at least those elements of control which affect the selected section of the path 11, in order to assure that the information reaching SDR is the same as that supplied by the source 1.

According to one aspect of the present invention, such extensive preliminary checking of the ordinary complex of input/output controls and transmission paths is considerably simplified by providing an additional FLT loading path 51 associated with special FLT load controls 3 of simplified design. Through this path FLT programs may be conveyed between a source such as 1 and SDR, by a relatively simple sequence of operations. The controls for such loading may be made correspondingly simple as will be apparent from the ensuing discussion.

Referring to FIG. 1, the FLT load controls 3 control the movement of program or other intelligence between an information source such as 1 and MS via the special path 51. Details of the controls 3 are discussed below with reference to FIG. 4. Control functions performed by the controls 3 are suggested by the broken lines 61 to 69 and words adjacent thereto which characterize the effects controlled by the signals carried on respective lines.

Ordinarily, the controls 3 are inactive (NOT FLT LOAD MODE). When an FLT program is to be loaded into MS for subsequent use by CPU to find the location of a fault, provided that it is not in path 51, the controls 3 are activated to an FLT LOAD MODE condition by a signal on the input designated 80. This signal may for example be provided by movement of a toggle switch to one of two positions. When the FLT loading operation is completed the circuits 3 may be reset to the idle condition by energizing line 81; for example, by reversing the position of the aforementioned toggle switch. Before beginning an FLT load operation the storage address register SAR within the CPU is loaded with an initial address word by means not shown.

It will be noticed that information moving from source 1 through path 51 is presented to SDR via a third group of inputs to OR-circuits 7 and to the parity checikng circuits 12. It is also to be noted that the circuits 12 are effective during FLT loading to produce an alarm or "no check" output indication when presented with a word of FLT information having invalid parity. It would seem therefore that if one were to attempt to deliberately transmit an FLT word to SDR in an invalid "no check" parity format, an alarm indication would invariably be generated by the circuits 12 on the line 64 extending to the controls 3. However, such a "no check" alarm would then be useless to distinguish between a desired invalid configuration and one due to a transmission fault in path 51. Hence, the handling of the information in path 51 could not be checked, and it would be necessary to ignore or suppress the alarm indication. This is undesirable since it complicates the FLT load procedure while sacrificing an important element of reliability. Accordingly, when operating in the FLT LOAD MODE, the controls 3 are adapted to permit the parity check circuit 12 to function as an ordinary parity check circuit to produce check or "no check" indications while at the same time the contents of SDR are manipulated in a predetermined manner to produce desired words of predetermined information in MS. Some of the latter words may have predetermined "no check" parity conditions which could not pass through the check circuit 12 without causing a "no check" alarm, but the words used to form the desired words, in the absence of transmission error, will invariably cause the circuits 12 to emit a valid or good parity check indication.

In brief, this effect is obtained by passing pairs of digital words, each having so-called valid parity if not mishandled, through the path 51 and combining the words of each pair at the outlet of the path. The combining effect is produced by mixing corresponding individual bits of the words of each pair of words in the OR-circuits 7 leading into SDR. This is accomplished by selecting a single address location in MS while both words of the pair are transferred—e.g. by twice conditioning SAR with the same address information—and alternating between a STORE and a hybrid STORE-FETCH routine within MS. It is a relatively simple matter to verify that a digital word formed by mixing, or "OR-ing," individual bits of two other words of information can have any desired conditon of parity, good or bad. Consider the following example.

Define two successively transmitted thirty-six bit words of binary information, A and B, as follows:

$$A=a_0a_1 \dots a_{35}$$
$$B=b_0b_1 \dots b_{35}$$

Define byte subdivisions, $A_0$, $A_1$, $A_2$, $A_3$, of A as follows:

$$A_0=a_1 \dots a_7$$
$$A_1=a_8 \dots a_{15}$$
$$A_2=a_{16} \dots a_{24}$$
$$A_3=a_{25} \dots a_{31}$$

Define similar byte subdivisions of B:

$$B_0=b_0 \dots b_7$$
$$B_1=b_8 \dots b_{15}$$
$$B_2=b_{16} \dots b_{24}$$
$$B_3=b_{25} \dots b_{31}$$

Assume that $a_{32}$, $a_{33}$, $a_{34}$ and $a_{35}$ are transmitted parity parity bits accompanying and relating to bytes $A_0$, $A_1$, $A_2$, and $A_3$, respectively, and that $b_{32}$, $b_{33}$, $b_{34}$, $b_{35}$, represent respective transmitted parity bits accompanying bytes $B_0$, $B_1$, $B_2$, and $B_3$. Assume further that a transmitted byte is considered to have good parity and will yield a check indication if the group defined by the byte and its accompanying parity bit has even parity, and that otherwise the parity is to be considered bad and should result in a "no check" indication.

Let C be the word of information produced by OR-ing corresponding bits of A and B:

$$C=c_0c_1 \dots c_{35}$$
$$C_j=a_j+b_j \ (j=0 \text{ to } 35)$$

Notice that if A and B are identical then A and C are also identical since:

$$c_j=a_j+b_j=a_j+a_j=a_j$$

It may be shown however that if A and B are different, $c_{32}$, $c_{33}$, $c_{34}$ and $c_{35}$ may assume arbitrary values independently of the parity values of the bytes of the word C which correspond to respective bytes of A and B.

For example, assume $$A_0=00011111$$
$$B_0=11100000$$

For A and B to be translated and verified as correct the values of the respective associated parity bits $a_{32}$ and $b_{32}$ must both be 1, since $A_0$ and $B_0$ each have odd parity. However, $C_0(=A_0+B_0=11111111)$ has even parity, and the parity of $c_{32}$ is odd since $c_{32}=a_{32}+b_{32}=1$. Thus the combined parity of $C_0$ and $c_{32}$ is odd (i.e. bad).

This example can easily be extended to show that any pattern of bits C, other than an all 0's pattern, can be established at the terminus SDR of path 51 if appropriately selected words A and B are mixed in SDR. Significantly, the establishment in SDR of each such pattern C may be considered effectively verified by good parity check indications derived during handling of A and B, even though the actual parity of C may be bad and would induce a "no check" indication if C were passed directly through path 51.

Figure 3:
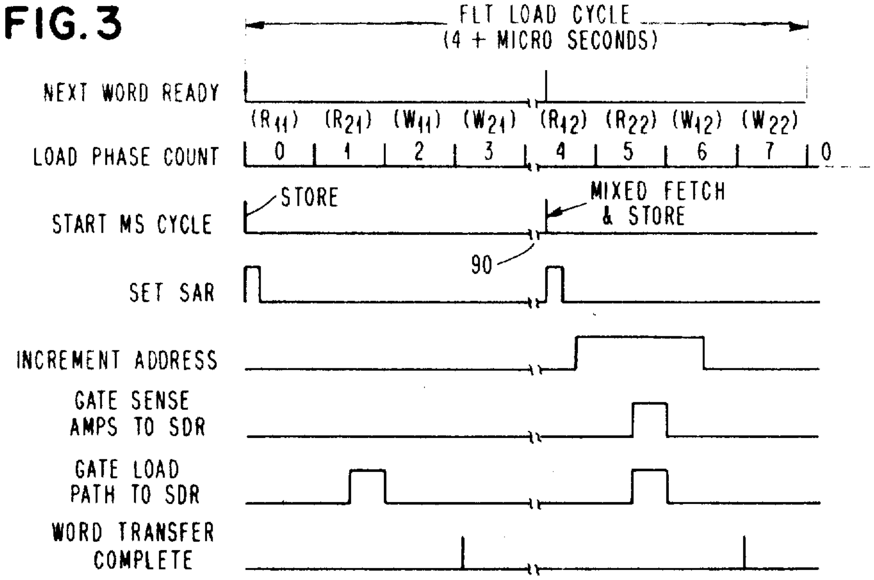
FIG. 3 is a timing chart illustrating the transfer of test program information into the said main store, via the special test program loading path 51 illustrated in FIG. 1, under the direction of the special test program loading controls 3 shown in schematic form in FIG. 1.

The operation of OR-ing two successive words A and B into SDR, to produce the arbitrary pattern C as defined above, is explained in greater detail with reference to FIGS. 1 to 3. Pairs of successive words of information, A, B, each pair transmitted from source 1 during two successive cycles of MS, are treated as single units of information C when the controls 3 are operated in FLT LOAD MODE condition. The first word of each pair is transmitted during a STORE cycle of MS and the second word of the pair is transmitted during a hybrid STORE-FETCH cycle of MS. When the first word A is made available in source 1, and MS is in an appropriate condition for receiving a word, as indicated on status line 66, a Next Word Ready signal on the source status lines 61 actuates the controls 3 to start a STORE cycle of MS via control connection 67 (FIG. 1). This causes MS to cycle through its four characteristic phases. In this STORE cycle these four phases of MS are distinctively denoted $R_{11}$, $R_{21}$, $W_{11}$, and $W_{21}$, respectively (FIG. 3).

As previously explained, the address register SAR has been set to an initial condition which represents an initial FLT loading address location in MS. This address is transferred to SAR during interval $R_{11}$ by the control connection 68. During phase $R_{21}$ of the same STORE cycle word A on load path 51 is gated to SDR while the sense amplifier outputs of MS are blocked. Since SDR is reset to an all zeroes condition at the conclusion of each MS cycle (line 40, FIG. 2) at the end of $R_{21}$ the contents of SDR corresponds to word A. Thus, in $W_{11}$ of the same MS cycle word A is transferred to the internal MS address location designated by the contents of SAR. During the last phase $W_{21}$ of this same cycle a Word Transfer Complete signal is issued via control status lines 62 indicating to source 1 that the CPU storage system is ready to accept the second word B of the FLT pair A, B, and SDR is reset.

When word B becomes available, source 1 again supplies a Next Word Ready signal on status lines 61 and controls 3 initiate the second cycle of MS, which is characterized as the hybrid STORE-FETCH cycle. The phases of this cycle are denoted $R_{12}$, $R_{22}$, $W_{12}$, $W_{22}$. In this cycle SAR is again set to the aforementioned initial address state when control connection 68 is activated. Accordingly, the previously selected address in MS will again be selected by SAR.

In this hybrid STORE-FETCH cycle not only is the B word of the pair A, B gated to the OR-circuits 7 feeding SDR, but also the digits of the previously stored word A, which now appear on the sense amplifier outputs of MS, are permitted to pass through the same OR-circuits. Consequently, corresponding bits of words A and B are combined in SDR during interval $R_{22}$ to form a third word C, having a parity condition, absent mishandling of A or B, which is dependent exclusively upon the programming of the words A and B, and not upon the individual parity conditions of A and B.

Since words A and B are checked by the parity check circuits 12, in effect the format of the word C may be considered checked regardless of whether the parity of C is good or bad. As suggested above, word C may be made identical to the first of the two associated words A and B merely by programming word B to be identical to word A. Thus, if one wishes to store FLT information with valid parity, it is merely necessary to program source 1 to transmit the word to be stored twice. On the other hand, if a "no check" parity condition is desired, it is necessary for the programmer of the source information to provide different words A and B, both having valid parity, which, if correctly transmitted, will merge to form the desired "no check" result word C.

It may also be noted that the information delivered by the source 1 need not accrue at any particular rate, since it is permissible to have a gap 90 of arbitrary duration between the STORE and hybrid STORE-FETCH FLT load cycles, as shown in FIG. 3. It would even be permissible for MS to be cycled by the ordinary CPU sequence controls, intermediate the first and second FLT loading cycles of MS, to provide other storage functions while information is collecting at the interface between source 1 and the special loading path 51, provided that the FLT load addresses supplied to SAR in the related STORE and hybrid STORE-FETCH cycles are always identical.

At the conclusion of a hybrid STORE-FETCH cycle the information word C is established in MS and therefore if further FLT loading operations are required, it is necessary to set a new FLT loading word address into SAR. This may be effected by incrementing the previous FLT load address previously held in SAR through CPU arithmetic circuits (not shown). Controls for such address incrementing are suggested at 69.

Figure 4:
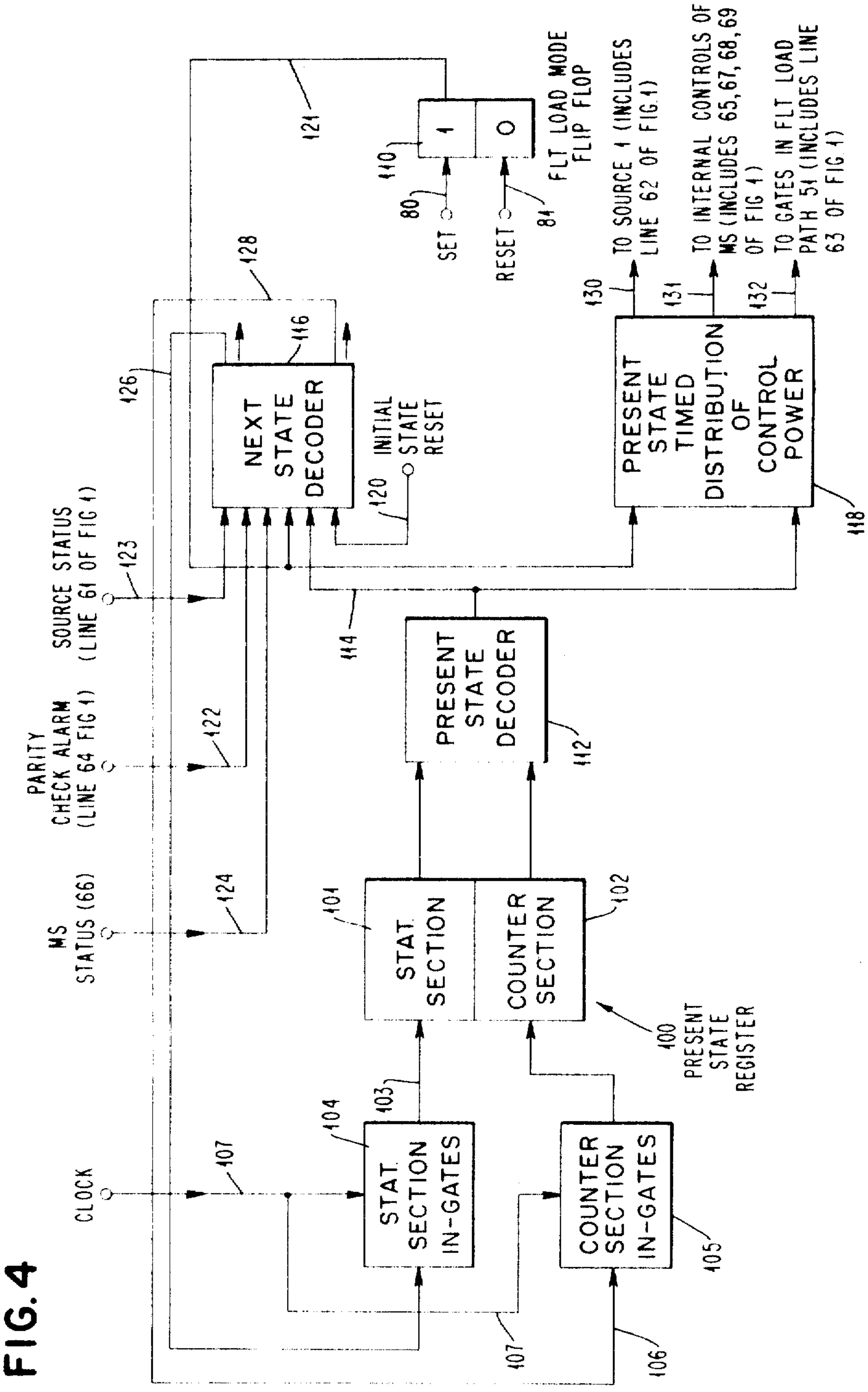
FIG. 4 is a schematic block diagram of the said test program loading controls 3.

The pertinent details of the FLT load controls are shown in FIG. 4. The basic element of control is PRESENT STATE register 100 having two distinct sections 101 and 102. Section 101 comprises a plurality (four, in the particular present embodiment) of non-interconnected flip-flop circuits, which are conditioned in parallel through outputs of 103 of respective IN-GATES indicated schematically at 104. Register section 102 comprises a plurality of interconnected binary trigger elements arranged to form a binary counter. Groups of IN-GATES 105 extending to these trigger elements in various combinations can admit signals to either advance the count by unit increments, reset the count to an initial count value, or leave the count unchanged, depending upon the signals carried on corresponding groups of input lines indicated schematically at 106 and on the conditions of enabling control line 107. It will be noted that the line 107 is also connected as enabling control input to IN-GATES 104. Enabling control line 107 is conditioned by the CPU clock.

The output of PRESENT STATE register 100 is translated by PRESENT STATE DECODER logic circuits 112 into a signal on one line of a plurality of lines all of which are represented schematically at 114. The lines 114 extend to NEXT STATE DECODER logic circuits 116 and control power timing and distributing logic circuits shown generally at 118. The circuits 116 react to either an INITIAL STATE RESET input 120 or to the combined conditions of lines 121, 114, 122, 123 and 124. Line 122 corresponds to the parity check alarm line 64 of FIG. 1 and line 123 corresponds to the source status line 61 of FIG. 1. Line 121 carries the FLT LOAD MODE control indication from mode flip-flop 110. Line 124 corresponds to MS status line 66 of FIG. 1.

When reacting to the signals on lines 121, 114, 122, 123, and 124, circuits 116 selectively translates the combination of input signal conditions to next state output signals on groups of lines 126 and 128. These signals designate the next sequential control state as a function of one or more factors including the present control state, the availability of source information words, the condition of receptivity of store MS, and the condition of the parity check alarm circuits. However, when a reset signal appears at input 120 the circuits 116 react only to the reset signal and produce a unique combination of outputs on 126 and 128 which is used to condition register 100 to a predetermined initial, or reset, control state.

Circuits for translating a combination of input signals to excitation of a selected one of a plurality of output lines, as are required for the decoder circuit 112, or for selectively translating an input signal into a corresponding combination of output signals, as are used in the decoder circuit 116, are well-known in the art and do not require further discussion herein, although it is worthwhile to note that typical circuits for performing these functions are described in many basic and well-known circuit design texts; for example, "The Design of Switching Circuits," by W. Keister, A. E. Ritchie and S. H. Washburn, particularly chapter 12, pages 288 et seq.

The control power timing and distributing logic circuits 118 are adapted to react to an excited input 114 to produce control signal outputs on the three groups of output lines 130, 131, and 132, in a selective sequence within each group. The group 130 extends to the source 1 of FIG. 1 and includes one or more lines, such as 62 (FIG. 1), as required to fully control the extraction of a word unit of information from the source 1. The group 131 extends to the internal controls of main store MS and includes lines for controlling all of the functions suggested at 65, 67, 68 and 69 in FIG. 1 with the timing shown in FIG. 3. The group 132 controls certain of the gates in the load path 51 considered in FIG. 1.

It will be immediately appreciated by those skilled in the processor design arts that the number of lines in each of the groups 130, 131, and 132, the sequence of control signals placed on the lines, and the power levels of the control signals so placed represent variable design factors which are determined by the details of construction and design of the units controlled by each group. Suppose, for example, that the controls 3 are required to be adapted to carry information from a particular source into path 51; e.g. from either a magnetic tape store or a magnetic disc store. It would be useless and perhaps meaningless to describe in detail the construction of the circuits associated with output group 130 without also describing the details of the source or sources controlled thereby. It will also be appreciated that the details of the construction of such sources would in no way be pertinent to the present invention. For that matter consideration of the unessential details of the source, loading path or main store systems would only tend to obscure the present explanation of invention without casting further light on the operation of the invention.

One additional point to note, however, is that the group 131 and its associated circuits must provide whatever signals are necessary to obtain mixing of corresponding bits of pairs of consecutively handled FLT words at a point between the parity check circuit and the input to the main store. As indicated in FIG. 3 it is sufficient for this purpose to enable MS to operate as it would normally operate for a pair of STORE operations but to include a control signal on lines 131 which prevents blocking of the sense amplifier outputs in the second STORE operation of the pair whereby a hybrid STORE-FETCH mixing effect is obtained. Note however that the same effect could be obtained in other ways; for example, by selectively inhibiting resetting of the register SDR after it receives the first word of an FLT pair, or by selectively preventing READ drive excitation from reaching the storage cores of MS while the second word of an FLT pair is being received.

In operation the circuits of FIG. 4 function as follows. Initially, line 120 is pulsed to actuate circuits 116 to deliver a predetermined reset state input, via lines 126 and 128, to the IN-GATES of register 100. This establishes register 100 in an initial, or reset, present control state when line 107 is next pulsed by an MS clock signal. Next, flip-flop 110 is set to the FLT LOAD MODE condition. This may be accomplished either manually, or automatically, in response for example to a signal indicating a circuit failure capable of being diagnosed by means of an FLT program.

At this point circuits 118 condition output group 130 to prepare source 1 to transmit its first unit of FLT program information; in the present embodiment the first byte of the first word. As the information source responds by activating the group of lines 123, circuits 116 react to the combination of a state signal on the lines 114 and the pulses on lines 123 to transfer an output to register 100. This initiates a sequence of control state changes appropriate to enable circuits 118 to assemble the complete word from source 1 and deliver it to SDR in synchronism with phase R21 of a "first" MS STORE cycle. This sequence is then continued to enable circuits 118 to assemble the second word of the first FLT pair and to deliver it to SDR during phase R22 of a "second" MS cycle during which the MS location addressed in the first cycle is again addressed. This second cycle would be an ordinary STORE cycle were it not for the fact that circuits 118 provide a signal on group 131 which inhibits the blocking of the path between the MS sense lines and SDR. Hence the first and second FLT words of the first pair are OR'd into SDR and stored in MS.

The process of "ORing" each successive pair of FLT words is repeated until all of the FLT program information, the actual words of which are composed by the combining of the input pairs, has been stored in MS.

If loaded without a parity check alarm on lines 4, some of the actual words of information will comprise test program instructions which will have been formed by combining a pair of identical words, and other actual words will represent test input information which will have been formed by combining either like or unlike pairs of words depending upon whether the information is intended to be used to verify a check or "no check" parity condition respectively when it is extracted from MS during running of the FLT program. If an alarm indication is received on line 64 during handling of any component word of a FLT pair from source 1 to SDR, or if the lines 66, 61, do not match what is expected for any state 114, circuits 116 do not condition 126 or 128 to a new state. Thus, register 100 is in a stopped state which can only be changed by manual intervention. Thus, whenever a component word is mishandled the controls "hang up" and the loading process terminates automatically. The operators in charge of loading may then attempt to repeat the previous handling; for example, by re-running the loading process from its inception, or they may manually trouble-shoot in the load path 51 and controls 3, depending on the place in the program stream at which the alarm indication occurs, and other factors not relevant to the present discussion.

While the invention has been shown and described above with reference to the loading of test information from an external source 1 into buffer register SDR of a computer main store MS the same principles may be used to propagate verified test information through any segment of a data transmission or data processing system to form a test control word altered in a predetermined manner at the output terminus of the segment. The general principle is explained with reference to FIG. 5. Predetermined information originates at a source 300 and is to be transmitted through a segment 301 of a data transmission system at the output of which it is delivered to a register or other storage device 302. A parity check circuit 303 is used to verify that the data is correct in form as it passes through segment 301. OR circuits 304 permit the output of segment 301 and the output of the register 302 to be selectively mixed digit-by-digit. Controls (not shown) functioning similarly to the controls 3 of FIG. 1, pass pairs of words from source 300 into register 302, merging corresponding digits of the words of each pair to obtain resultant words, absent mishandling, in a predetermined check or "no check" parity format.

Figures 5, 6:
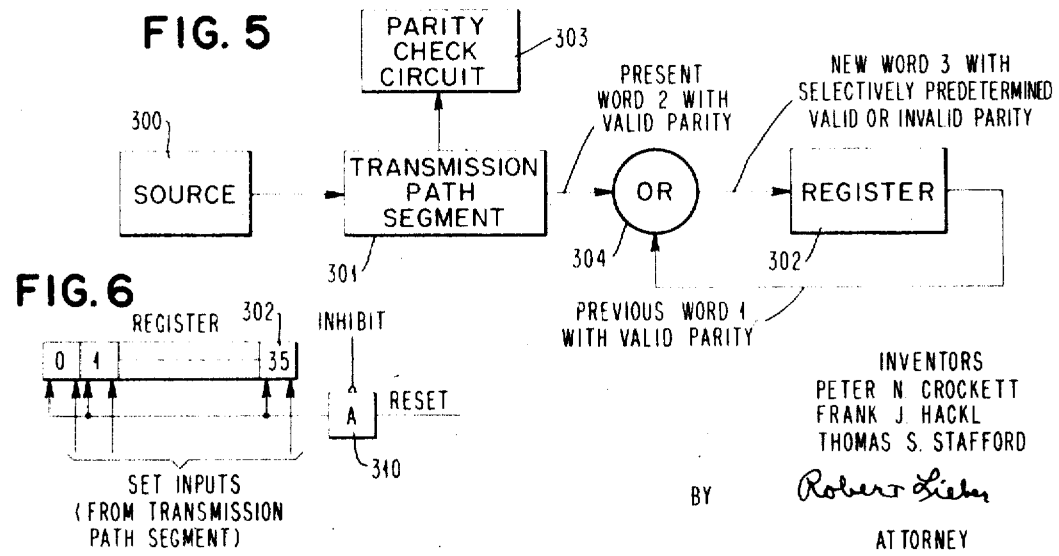
FIG. 5 is a schematic block diagram illustrating the broad aspects of the invention considered with reference to an arbitrary point within a data transmission system.
FIG. 6 illustrates a specific alternative receiving register arrangement for obtaining the mixing effect provided by OR-circuits in FIGS. 1 and 5.

An alternative to the use of OR-circuits 304 is to mix the words of a pair directly within the register 302, as suggested in FIG. 6. For this, each stage of the register must have a SET input and a RESET input. The SET inputs are conditioned by the individual digit of a word—a pulse on a digit line representing a one and no pulse on the same line representing a zero—and the RESET inputs are conditioned by a common reset control signal furnished through gate circuit 310. If the register is reset through gate 310 prior to receipt of the first word of a pair of words and thereafter not reset until after both words of the pair have been receeived, the digits of the word held in the register after receipt of the second word represent an OR function of the corresponding digits of the two words. Thus, the resultant word will have a predetermined good or bad parity and can be used to test positive or negative reactions of circuits coupled to the output of register 302, the latter circuits representing continuations of the transmission path segment 301.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a digital information handling system including a transmission path, a checking circuit coupled to the path, and a register also coupled to the path for receiving words of information which have been checked by the checking circuit, a system for selectively transmitting words of information mutated in a predetermined manner through said path into said register utilizing said check circuits to produce error indications only if such words are mutated in other than said predetermined manner as a result of mishandling in transmission comprising:

a source of predetermined information signal words;

means for connecting said source to said transmission path;

means for gating pairs of said information signal words into said register from said transmission path, whereby corresponding digits of the words of each said pair of words are mixed upon entry of the second word of the pair into said register; and means cooperative with said means for connecting and means for gating for controlling said checking circuit to check each word of said pair of words for the presence therein of a check or "no check" condition as each is handled through said transmission path;

said checking circuits being effective to produce a "no check" error indication only if one or more digits of one or both of the words constituting said pair of words are mishandled in transmission, irrespective of the check condition of the resultant word formed in said register by the mixing of said individual digits of said words.

2. A system according to claim 1 in which said checking circuits are adapted to perform a parity check on the digits of the said words handled through said path to verify that a predetermined check relationship exists between certain parity digits accompanying and forming part of each word and the remaining digits of the same word, and in which by virtue of the mixing of the said individual digits of the said pair of words, certain resultant words established in said register may contain parity digits which have a predetermined "no check" parity relationship to the remaining digits of the same resultant word.

3. A system for intentionally transmitting test control information having bad parity through a transmission system using circuits which check for good parity to check the handling of the test control information so that said information can be used reliably to check other circuits located beyond the output terminus of the transmission system to vertify that the circuits beyond react in an expected negative sense to known information having bad parity as well as in a positive sense to known information having good parity, comprising:

a source of predetermined information words;

a transmission system coupled to said source;

means coupled to said transmission system for storing information;

means coupled to said storing means for controlling said source to deliver a pair of predetermined information words to said transmission system;

a checking circuit operable to verify that each word of said pair of words is handled unchanged through said transmission system;

means coupled to said storing means for gating the said pair of words thereto with the first word of the pair retained in said storing means while the second word is being gated, to construct a resultant third word of information in said storing means the digits of which correspond to an OR function of respective digits of the said pair of words.

4. In a testing system:

means for selectively transmitting predetermined patterns of check and "no check" test information through a segment of a data handling system;

a checking circuit associated with the said segment which is operable to provide an error indication only for test information patterns that are mishandled in transmission regardless of the check condition of the information prior to transmission; and means for storing the said patterns at the terminus of said segment so that said patterns may be used to check other information handling circuits which can be reached from the said terminus.

5. In a digital data handling system including a main store and an information transmission connecting path for conveying information from an external source to the main store, a test program loading system comprising:

a source of predetermined binary digital test information;

means for controlling said store to non-destructively access a single address location therein twice while two binary information words are successively handled from said source through said connecting path into said store;

means coupled to said store for linearly mixing corresponding bits of said two words; and means coupled to said connecting path for individually checking the said words as each traverses said connecting path.

6. In a digital information handling system including internal testing controls for diagnosing circuit failures under program control, a test program loading system comprising:

a source of predetermined test signals;

a special test program loading path for coupling a program of test signals into said information handling system while bypassing ordinarily used input paths which have more complex controls and are therefore more likely to experience failure; and a special sequence control circuit operable independently of other sequence controls of said information handling system for controlling the movement of test signals through said special loading path.

7. A test program loading system as recited in claim 6 and further comprising:

an information checking circuit coupled to said special loading path which is effective to produce an output error indication whenever the digits of an information word circulating through said special path are in other than a predetermined checking relationship relative to each other;

said special sequence control circuit including means for manipulating the predetermined test signals as they emerge from said special path to produce predetermined test words having digits selectively modified to satisfy a relationship which differs from said predetermined relationship.

8. In a digital data handling system including a central processor unit having a main program store adapted to store words of information consisting of first and second groups of digits which ordinarily have a first predetermined checking function relationship relative to each other, and which are usually subjected to checks prior to entry into said store to verify the existence of said first predetermined relationship, a special test program loading system for loading said store with verified words of information having a second predetermined checking relationship which is not necessarily the same as said first relationship comprising:

a source of predetermined pairs of test words;

a special test word loading path for connecting said source to said store;

a parity check circuit coupled to said loading path;

load control means coupled to said store, said check circuit, and said special path for combining a second word of a pair of words transmitted through said special path with the stored first word of the pair to enter a selectively modified third word of information into said store;

each word of said pair of words being programmed to invariably satisfy a predetermined parity relationship checked by said check circuit if properly handled in said path and to combine to form a third word having digits which may selectively be predetermined to fail to satisfy said relationship so that said third word is useful to check the operational effectiveness of other circuits connectable to said store.

9. In a parity checked digital data transmission system, operating controls for selectively passing data modified in a predetermined manner through a segment of the system while effectively verifying proper handling of the data and its predetermined modification by ordinary parity checking procedures, comprising:

control means effective in one mode of operation of said system to combine corresponding digits of pairs of consecutive word units of information transmitted through said segment to form selectively modified data word units at an output terminus of the segment;

certain data word units formed at said output terminus having predetermined "no check" parity conditions despite verification of the existence of a predetermined check parity condition in the individual word units of the associated pair; and means coupled to said segment for verifying that said individual word units of said pairs are properly handled through said segment.

10. Test program load controls for use with a main store of a digital data processor, comprising:

a source of predetermined test word signals;

a special test program load transmission path for handling predetermined test word signals from said source to said main store;

a parity check circuit coupled to said path for checking individual test words handled to said store to verify that said individual words are not altered during handling; and special load controls for coordinately controlling said source, said check circuit, and the address controls of said main store to transfer information to said store corresponding to the test words issued by said source but selectively modified in a predetermined sense;

said special load controls including:

first means effective to condition the address controls of said main store to repeatedly select a single address in said store while two associated words of information are transmitted through said path to said store;

second means effective to control said store to operate a first time to store the first of said two associated words at said selected address and then a second time to transfer the second word to said selected address while coincidentally regeneratively storing the first word, thereby effectively storing a selectively modified word; and third means for varying the address selected by said address controls after storage of said selectively modified word.

11. A method of effectively transferring units of digital information intended to exhibit predetermined check and "no check" parity characteristics through a transmission path monitored by an active parity check circuit in such a manner as to cause said check circuit to produce a "no check" alarm indication for any unit only if the information content of the unit is mishandled, without regard to the actual intended parity characteristic of the units, comprising steps of:

prior to said transfer transforming each said unit into a plurality of predetermined sub-units of corresponding digital information;

each plurality of sub-units having digits combinable according to a predetermined logic function to reconstruct the digits of the corresponding unit;

the digits of each sub-unit having said predetermined check parity characteristic when first assembled;

transferring the sub-units of each unit in consecutive sequence through said monitored transmission path; and performing operations corresponding to said predetermined logic function upon said sub-units to reconstruct the corresponding units at the remote end of said path.

12. A method of loading predetermined units of digital information representing a diagnostic test program into an internal program store of a data processing system while verifying that said units are not mishandled in the process of said loading comprising steps of:

assembling groups of predetermined sub-units of information prior to said loading, each sub-unit corresponding to one of the units to be loaded, each sub-unit being known to have a valid parity check characteristic, the digits of said sub-units of each group having a predetermined logical relationship inter se enabling the corresponding unit to be constructed by one or more logical operations on said digits;

transferring said assembled group of sub-units to a circuit operable to perform said logical operations on said digits, to thereby construct said corresponding units, via a circuit path monitored by an active parity checking circuit operable to produce a "no check" alarm indication if any sub-unit is mishandled, said constructed units in the absence of an alarm indication, and assuming proper operation of said logical operation performing circuits, having predetermined parity check characteristics which may be either valid or invalid with respect to the check characteristic monitored by said parity checking circuit; and, absent an alarm indication, loading said constructed units into the said internal store of said data processing system.

13. In a digital data processing system the combination of:

a circuit path specializing in the handling of diagnostic test information;

parity check circuit means continuously monitoring said path and operable to issue an alarm indication when presented with information having an invalid parity condition;

means coupled to said path for transferring a plurality of groups of sub-units of information through said path, said sub-units each having a predetermined valid parity condition prior to said transfer, corresponding digits of said sub-units of each group of sub-units having a predetermined logic function relationship whereby some of said groups may be combined according to said logic function to construct corresponding units having predetermined invalid parity conditions and others of said groups may be combined according to the same function to construct units having valid parity conditions; and means coupled to said path and said transferring means and operable in the absence of a said alarm indication to operate according to said logic function to construct the said units from the corresponding groups.

14. In a digital data processing system:

a circuit path adapted to carry predetermined information having a predetermined relation to a program of predetermined test information to be delivered at the outlet of said path;

a source of said predetermined information connected to an inlet of said path;

a continuously active parity check circuit coupled to said path for producing an alarm indication when presented with information having an invalid parity condition; and logical combining means coupled to said check circuit and the outlet of said path for operating to selectively modify said information to produce said test information in the absence of a said alarm indication.

15. In a digital data processing system including an internal program store and adapted to operate upon diagnostic test programs stored in said store to locate faults in other internal parts of the system, a test program loading system for entering into said store test information having both predetermined invalid parity conditions and predetermined valid parity conditions while continuously monitoring the information being entered into said store to detect mishandling of the information, comprising:

a random access store operable ordinarily in alternatively selectible non-destructive FETCH cycles and destructive STORE cycles to either retrieve stored information or store new information respectively;

a source of predetermined sub-units of information having digits arranged to be combinable by logical ORing in associated pairs to construct associated whole units of test program information sought to be entered in said store, each sub-unit having a predetermined valid parity condition when delivered from said source;

a circuit path for carrying information in sub-units from said source to said store;

parity check circuit means coupled to said circuit path for continuously monitoring the parity condition of sub-units carried therein to produce an alarm indication upon detection of an invalid parity condition in any sub-unit;

means coupled to said source, said circuit path, said store, and said parity check circuit means for operating to consecutively transfer associated pairs of sub-units from said source to said store absent an alarm indication from said check circuit means;

said last-mentioned means including means for operating said store to address one address location in said store in two consecutive cycles for each pair of associated sub-units, the first time to request an ordinary destructive STORE cycle in which the said address is first cleared of whatever information it held previous to said cycle and then receives the first sub-unit of the associated pair, and the second time to request a non-destructive STORE (hybrid STORE-FETCH) cycle in which the digits of the second sub-unit are effectively OR'd with the digits of the previously stored first sub-unit, the resultant information stored at said one address location constituting the said whole unit of test program information associated with said pair of sub-units.

References Cited

UNITED STATES PATENTS

| | | | |
|---|---|---|---|
| 2,805,278 | 9/1957 | Van Duuren | 340—146.1 X |
| 2,945,915 | 7/1960 | Strip | 340—146.1 X |
| 3,027,542 | 3/1962 | Silva | 340—146.1 X |
| 3,257,546 | 6/1966 | McGovern | 235—153 |

MALCOLM A. MORRISON, Primary Examiner

CHARLES E. ATKINSON, Assistant Examiner

U.S. Cl. X.R.

340—146.1, 172.5